(12) United States Patent
Gu

(10) Patent No.: US 11,106,004 B2
(45) Date of Patent: Aug. 31, 2021

(54) CONNECTING DEVICE FOR FOCUSING LENS OR AIMING LENS

(71) Applicant: Shenzhen Sansong Mechanical & Electrical Co., Ltd., Shenzhen (CN)

(72) Inventor: Chenghua Gu, Shenzhen (CN)

(73) Assignee: SHENZHEN SANSONG MECHANICAL & ELECTRICAL CO., LTD., Shenzhen (CN)

(*) Notice: Subject to any disclaimer, the term of this patent is extended or adjusted under 35 U.S.C. 154(b) by 142 days.

(21) Appl. No.: 16/525,607

(22) Filed: Jul. 30, 2019

(65) Prior Publication Data
US 2020/0049941 A1    Feb. 13, 2020

(30) Foreign Application Priority Data
Aug. 10, 2018    (CN) .......................... 201821292930.9

(51) Int. Cl.
*G02B 7/02* (2021.01)
*G02B 7/14* (2021.01)
*G02B 7/04* (2021.01)
*G02B 21/24* (2006.01)

(52) U.S. Cl.
CPC .................. *G02B 7/14* (2013.01); *G02B 7/04* (2013.01); *G02B 21/241* (2013.01)

(58) Field of Classification Search
CPC ........... G02B 7/14; G02B 7/04; G02B 21/241
USPC .................. 359/811, 818, 819, 822, 823, 827
See application file for complete search history.

(56) References Cited

U.S. PATENT DOCUMENTS

2008/0146878 A1* 6/2008 Frost ...................... A61B 1/267
600/188

\* cited by examiner

*Primary Examiner* — William Choi

(57) ABSTRACT

A connecting device for connecting to a focusing lens or an aiming lens includes a frame detachably connected to an external device and including an installing member for fixing with a lens, and a fastening member for connecting the frame with the external device. The fastening member includes at least one group of wedge-shaped pair members engaged with each other and an adjusting device for driving two components with the at least one group of wedge-shaped pair members to slide relatively to the external device so that the frame can be tightly fixed with the external device. The frame can be tightly and reliably fixed with a guiding slider via the wedge-shaped pair member when they are locked to each other, and the adjusting device is provided for conveniently adjusting or locking the frame and the guiding slider so that the installation or disassembly of the frame can be conveniently obtained.

16 Claims, 2 Drawing Sheets

CONNECTING DEVICE FOR FOCUSING LENS OR AIMING LENS

BACKGROUND

1. Technical Field

The present disclosure generally relates to connecting devices field, and especially relates to a connecting device for connecting with a focusing lens or an aiming lens.

2. Description of Related Art

Focusing lenses or aiming lenses are commonly used for microscopes and sighting-telescopes. It is generally needed to adjust its lens position of the microscope or a sighting-telescope during using the microscope or the sighting-telescope. In a conventional microscope or a sighting-telescope, the lens is generally received in an installation structure within a lens frame which is connected with a body of the microscope or the sighting-telescope by a connecting device.

One kind of conventional connecting structure used for the above components is described below: the lens frame is directly fixed with the connecting device and then the connecting device is movably connected to the body of the microscope or the sighting-telescope. However, in such kind of connecting structure above mentioned, the lens frame can't be removed so that the microscope or the sighting-telescope can take up a great space when it isn't used. Another kind of conventional connecting structure used for the above components is described below: the lens frame is locked to the connecting device by bolts on its both sides of the lens frame, and then the connecting device is movably connected with the body of the microscope or the sighting-telescope. However, in such kind of connecting structure, the lens frame can't be conveniently disassembly and such lock mode is also easy to cause shaking of the lens to affect an observation. Furthermore, the lens frame is fastened only by the bolts arranged on two sides of the lens frame so that an installation angle of the lens frame can offset when bolt holes become bigger as time goes on.

SUMMARY

The technical problems to be solved: in view of the shortcomings of the related art, the present disclosure relates to a connecting device for a focusing lens or an aiming lens, the connecting device includes a frame for installing a lens thereon with a fastening member which includes at least one group of wedge-shaped pair members, a sliding groove arranged on the frame and a guiding slider connected to an external device, so it can be tightly and reliably fixed the frame with the guiding slider via the at least one group of wedge-shaped pair members so that the connection between them is more stable when they are locked to each other, and an adjusting device is provided for conveniently adjusting or locking the frame and the guiding slider so that the installation or disassembly of the frame can be conveniently obtained.

The technical solution adopted for solving technical problems of the present disclosure is:

a connecting device for a focusing lens or an aiming lens includes a frame detachably connected to an external device and including an installing member fixed with a lens, and a fastening member connected the frame with the external device. The fastening member includes at least one group of wedge-shaped pair members engaged with each other, and an adjusting device configured for driving two components which form the at least one group of wedge-shaped pair members to slide relatively to each other.

Wherein the fastening member includes a sliding groove arranged on the frame and a guiding slider connected to the external device, the sliding groove including a pair of first conical slopes and the guiding slider including a pair of second conical slopes respectively matched with a corresponding first conical slope, the first and second conical slopes cooperatively formed the at least one group of wedge-shaped pair members, and the adjusting device formed between the frame and the guiding slider to drive the first conical slope and the second conical slope to slide relatively to each other.

Wherein the adjusting device includes a screw pair member formed on the frame or the guiding slider.

Wherein the adjusting device includes a buckle with a lever structure arranged on the frame or the guiding slider.

Wherein the adjusting device includes a plurality of locating holes arranged on the guiding slider.

Wherein the frame includes a notch provided for the frame sliding on the guiding slider.

Wherein the notch is an opening of the sliding groove and includes a pair of protruding platforms respectively protruding from two sides of the notch towards a central axis direction of the sliding groove, the pair of first conical slopes respectively arranged on a corresponding protruding platform, and the guiding slider includes a boss matched with the sliding groove.

Wherein the first conical slope extends from the inside of the protruding platform to an edge of the same protruding platform along a direction gradually away from the notch to form the slope.

Wherein the first conical slope extends from the inside of the protruding platform to an edge of the same protruding platform along a direction gradually near the notch to form the slope.

Wherein the installing member includes a connecting ring with a cylindrical inner-hollow structure, the connecting ring including a pair of adjusting screws symmetrically formed to fasten the lens thereon.

The present disclosure provides the advantages as below. The structure of the present disclosure can be tightly and reliably fixed the frame with a sliding rail via the wedge-shaped pair member so that the connection between them is more stable when they are locked to each other, and the adjusting device is provided for conveniently adjusting or locking the frame and the sliding rail so that the installation or disassembly of the frame can be conveniently obtained.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
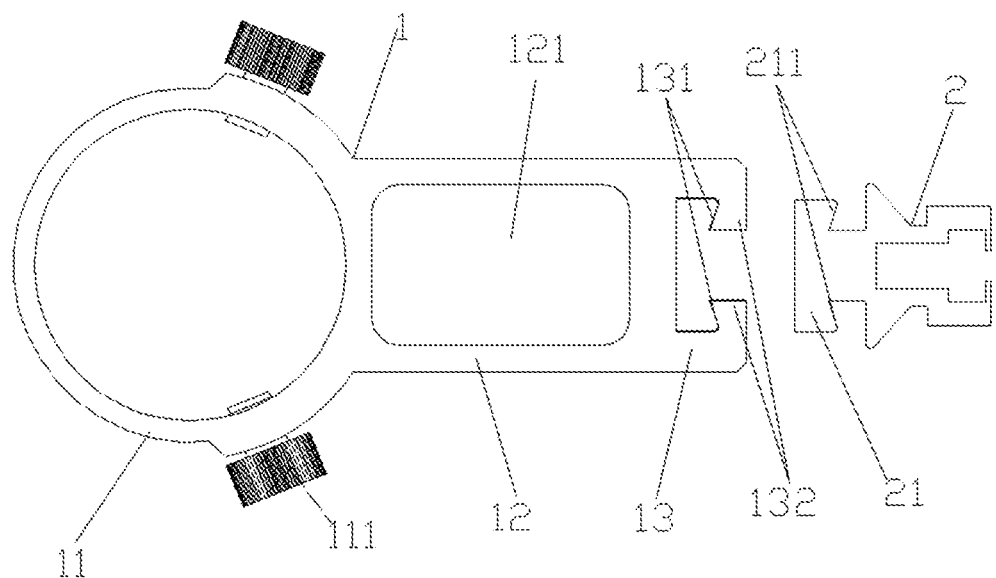
FIG. 1 is a schematic view of the connecting device for a focusing lens or an aiming lens in accordance with a first exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The disclosure is illustrated by way of example and not by way of limitation in the figures of the accompanying drawings, in which like reference numerals indicate similar elements. Unless otherwise defined, the technical or scientific terms of the present disclosure have a general meaning understood by one of ordinary skill in the related art.

In the description of the present disclosure, it needs to be understood that the terms mentioned below: "central", "longitudinal", "transverse", "length", "width", "thickness", "upper", "below", "front", "back", "left", "right", "vertical", "horizontal", "top", "bottom", "inner", "outer", "clockwise", "anticlockwise", etc, are shown in the specification of the present disclosure. The indicated orientation or position of the terms shown in the detailed description is based on the orientation or position shown in the figures of the accompanying drawings of the present disclosure, which is only to easily simplify the description of the present disclosure, but not indicated that the devices or elements of the present disclosure should have a particular orientation or should be designed and operated in a particular orientation. So the terms illustrated in the detail description are not by way of the limitation of the present disclosure.

In addition, the terms such as "first" and "second" shown in the specification are only used to describe, but not indicated that the elements of the present disclosure is important or represented the amount of the elements. That is, the features limited by the terms of "first" and "second" may explicitly or implicitly include one or more features. In the description of the present disclosure, the meaning of the term "a plurality of" is not less than two unless it is specifically illustrated.

In the present disclosure, except where specifically otherwise illustrated or limited, the terms "install", "connect", "link" and "fix" used herein should be understood in a broad sense. Such as, the meaning may be tight connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure.

In the present disclosure, except where specifically otherwise illustrated or limited, a first feature is arranged "above" or "below" a second feature, which means the first feature can directly connect with the second feature, or the first feature can't directly connect with the second feature, but connect with the second feature via other features between them. Furthermore, the first feature is arranged "onto", or "on top of", or "above", or "upward" the second feature, which means the first feature is arranged right above or the inclined top of the second feature, or a level height of the first feature is higher than that of the second feature. Meanwhile, the first feature is arranged "under", or "underneath", or "below", or "downward" the second feature, which means the first feature is arranged under or below the second feature, or a level height of the first feature is smaller than that of the second feature.

The following disclosure is illustrated by way of example in the figures of the accompanying drawings, in which like reference numerals indicate similar elements.

Figure 2:
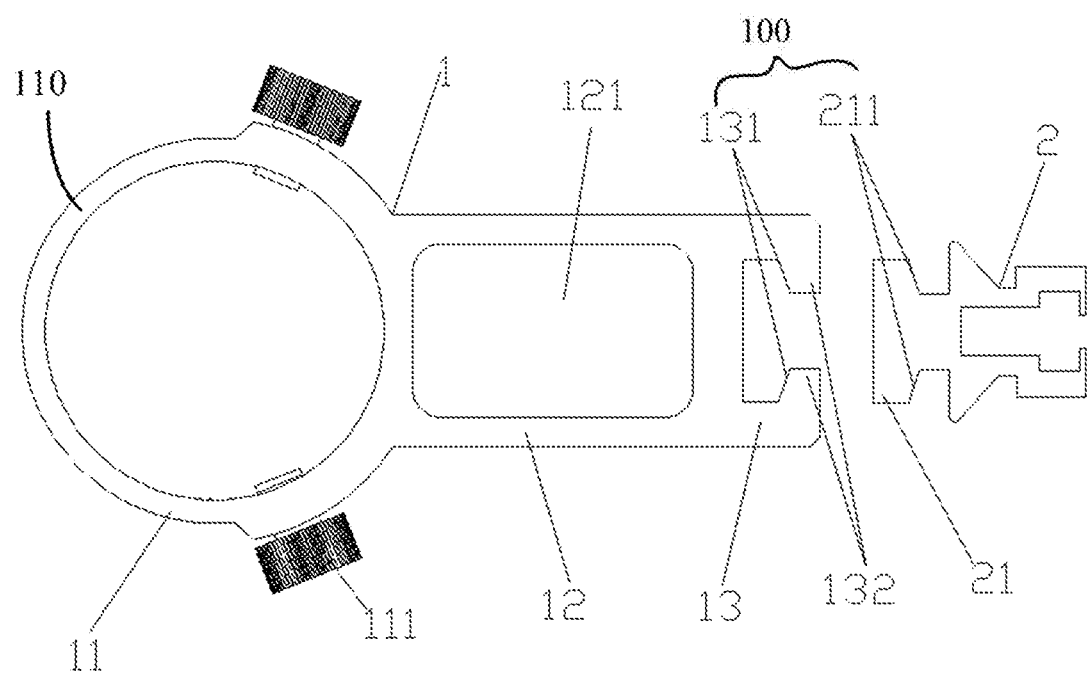
FIG. 2 is a schematic view of the connecting device for a focusing lens or an aiming lens in accordance with a second exemplary embodiment.
Figure 3:
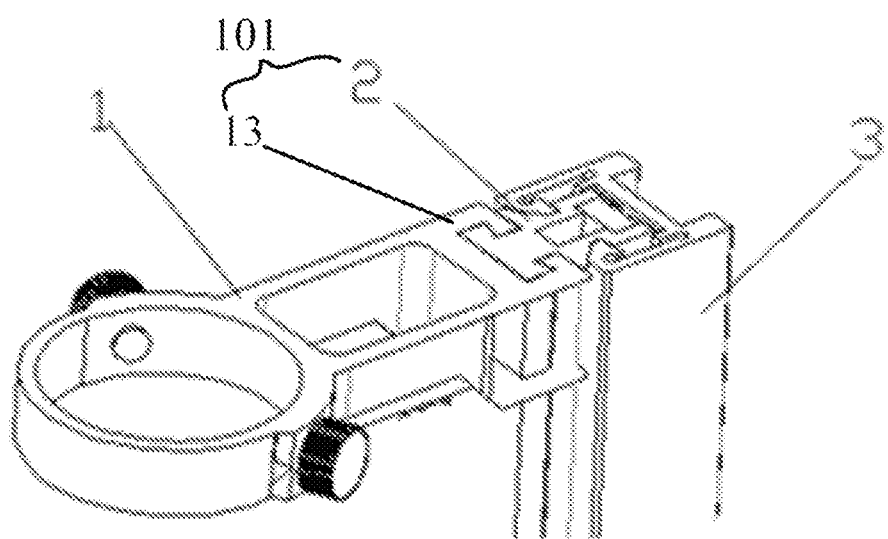
FIG. 3 is an assembly schematic view of the connecting device of FIG. 1.

Referring to FIGS. 1-3, a connecting device for a focusing lens or an aiming lens includes a frame 11 detachably connected to an external device 3 and including an installing member 11 fixed with a lens, and a fastening member 101 connected the frame 1 and the external device 3. The fastening member 101 includes at least one group of wedge-shaped pair members 100 engaged with each other, and an adjusting device configured for driving two components which form the at least one group of wedge-shaped pair members 100 to slide relatively to each other.

Specifically, the frame 1 includes a lens supporting member which includes the installing member formed thereon, and a guiding slider 2 connected to the external device 3. The fastening member 101 includes a sliding groove 13 arranged on the frame 1 and the guiding slider 2 connected to the external device 3. The sliding groove 13 includes a pair of first conical slopes 131 and the guiding slider 2 includes a pair of second conical slopes 211 respectively matched with a corresponding first conical slope 131. The first and second conical slopes 131, 211 are cooperatively to form the wedge-shaped pair member 100, and the adjusting device is formed between the frame 1 and the guiding slider 2 for driving the first conical slope 131 and the second conical slope 211 to slide relatively to each other.

Furthermore, in an exemplary embodiment of the present disclosure, the installing member 11 includes a connecting ring 110 with a cylindrical inner-hollow structure. The connecting ring 110 includes a pair of adjusting screws 111 symmetrically formed to fasten the lens thereon so that the lens can be reliably installed in the installing member 11. A connecting rod 12 is connected between the installing member 11 and the sliding groove 13. The connecting rod 12 includes a pair of parallel bars formed thereon and a rectangular hollow chamber 121 formed among the installing member 11, the pair of parallel bars and the sliding groove 13.

As an exemplary embodiment of the present disclosure, a part of the sliding groove 13 connected with the connecting rod 12 includes a thread through-hole and the frame 1 includes the rectangular hollow chamber 121 so that bolts can pass through the thread through-hole from the rectangular hollow chamber 121 and then in contact with the guiding slider 2. The installation position of the frame 1 installed on the guiding slider 2 can be adjusted via loosening the bolts. After the frame 1 is adjusted to its required position, the bolt can be tightened so that one end of the bolt is tightly connected to the boss 21 until the frame 1 is stably installed in a preset position. Of course, such screw pair member can also be set on the guiding slider 2 to adjust the installation position of the frame 1 according to the manner mentioned above.

As another exemplary embodiment of the present disclosure, a part of the sliding groove 13 connected with the connecting rod 12 includes a through-hole so that a spacer can pass through the through-hole from the rectangular hollow chamber 121 and then in contact with the guiding slider 2, while, the frame 1 includes a lever fulcrum arranged adjacent to the through-hole. So, one end of the lever in a buckle with such lever structure is rotatably connected with the spacer, and a position of one of the non-two ends of the lever is rotatably connected to the lever fulcrum, and the other end of the lever is fastened on the frame 1. The installation position of the frame 1 installed on the guiding slider 2 can be adjusted via loosening the lever, and the spacer is simultaneously out of touch with the boss 21 of the guiding slider 2. After the frame 1 is adjusted to its required position, the spacer is tightly connected to the boss 21 until the frame 1 is stably installed in a preset position and then the lever is fastened. Of course, such buckle with the lever structure can also be set on the guiding slider 2 to adjust the installation position of the frame 1 according to the manner mentioned above.

Furthermore, the adjusting device includes a plurality of locating holes arranged on the guiding slider 2. The plurality of locating holes is arranged in several common positions where the frame 1 is to be positioned on the guiding slider 2. In this way, when the frame 1 is needed to be fixed to such common positions, these positions can be found more accurately and the frame 1 can be further stably connected to the guiding slider 2.

Specifically, the frame 1 includes a notch provided for the frame 1 sliding on the guiding slider 2. The notch is an opening of the sliding groove 13 and includes a pair of protruding platforms 132 respectively protruding from two sides of the notch towards a central axis direction of the sliding groove 13. The pair of first conical slopes 131 is respectively arranged on a corresponding protruding platform 132 and the guiding slider 2 includes a boss 21 matched with the sliding groove 13.

As an exemplary embodiment of the present disclosure, referring to FIG. 1, the first conical slope 131 extends from the inside of the protruding platform 132 to an edge of the same protruding platform 132 along a direction gradually away from the notch to form the slope. In this way, the first conical slope 131 facing the central axis of the sliding groove 13 is in a barb shape.

As another exemplary embodiment of the present disclosure, referring to FIG. 2, the first conical slope 131 extends from the inside of the protruding platform 132 to an edge of the same protruding platform 132 along a direction gradually near the notch to form the slope. In this way, the first conical slope 131 facing the central axis of the sliding groove 13 is in a hook shape.

The guiding slider 2 is a long strip configuration so that the upper of the guiding slider 2 is formed the boss 21 to match with the sliding groove 13. The second conical slope 211 is arranged on the boss 21. When the frame 1 is connected to the guiding slider 2, the second conical slope 211 is fit with the first conical slope 131 of the sliding groove 13, thereby the frame 1 can movably connect with the guiding slider 2 and the guiding slider 2 is installed on the external device 3.

When the frame 1 is fastening on the guiding slider 2, the first conical slope 131 is in contact with the second conical slope 211. Comparing to a general buckle structure, the analysis of force relationship is shown that, the structure with such wedge-shaped pair member is subject to not only an interaction force formed therebetween, but also to form a component force of the interaction force in a vertical direction and a horizontal direction. So, it is undoubted that the connection between the frame 1 and the guiding slider 2 can be more tightly fixed under these forces. In addition, even though the bolt hole becomes larger due to a long-term usage, the installation angle of the frame 1 can't be offset under the interaction force between the first conical slope 131 and the second conical slope 211. In this way, the adjustment or locking between the frame 1 and the guiding slider 2 can be done by the adjusting device, which is more convenient to install or remove relative to the conventional connection means.

In the description of the present disclosure, the terms mentioned below: "an exemplary embodiment", "some exemplary embodiments", "one embodiment", "some embodiments", "an example", "a specific example" and "some examples" means that the specific characteristics, structures, materials or characteristics described by the embodiments or examples are included in at least one embodiment or example of the present disclosure. In the specification, a schematic representation of the above terms does not necessarily refer to the same embodiment or example. Furthermore, the specific characteristics, structures, materials or characteristics described may be combined in any one or more embodiments or examples in an appropriate manner.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A connecting device for a focusing lens or an aiming lens comprising:
   a frame detachably connected to an external device and comprising an installing member fixed with a lens;
   a fastening member connecting the frame with the external device and comprising at least one group of wedge-shaped pair members engaged with each other and an adjusting device configured for driving two components which form the at least one group of wedge-shaped pair members to slide relatively to each other;
   wherein the fastening member comprises a sliding groove arranged on the frame and a guiding slider connected to the external device, the sliding groove comprising a pair of first conical slopes and the guiding slider comprising a pair of second conical slopes respectively matched with a corresponding first conical slope, the first and second conical slopes cooperatively formed the at least one group of wedge-shaped pair members, and the adjusting device formed between the frame and the guiding slider to drive the first conical slope and the second conical slope to slide relatively to each other; and
   the adjusting device comprises a screw pair member formed on the frame or the guiding slider.

2. The connecting device as claimed in claim 1, wherein the adjusting device comprises a buckle with a lever structure arranged on the frame or the guiding slider.

3. The connecting device as claimed in claim 2, wherein the adjusting device comprises a plurality of locating holes arranged on the guiding slider.

4. The connecting device as claimed in claim 2, wherein the installing member comprises a connecting ring with a cylindrical inner-hollow structure, the connecting ring comprising a pair of adjusting screws symmetrically formed to fasten the lens thereon.

5. The connecting device as claimed in claim 1, wherein the adjusting device comprises a plurality of locating holes arranged on the guiding slider.

6. The connecting device as claimed in claim 5, wherein the frame comprises a notch provided for the frame sliding on the guiding slider.

7. The connecting device as claimed in claim 6, wherein the notch is an opening of the sliding groove and comprises a pair of protruding platforms respectively protruding from two sides of the notch towards a central axis direction of the sliding groove, the pair of first conical slopes respectively arranged on a corresponding protruding platform, and the guiding slider comprises a boss matched with the sliding groove.

8. The connecting device as claimed in claim 7, wherein the first conical slope extends from the inside of the protruding platform to an edge of the same protruding platform along a direction gradually away from the notch to form the slope.

9. The connecting device as claimed in claim 8, wherein the installing member comprises a connecting ring with a cylindrical inner-hollow structure, the connecting ring comprising a pair of adjusting screws symmetrically formed to fasten the lens thereon.

10. The connecting device as claimed in claim 7, wherein the first conical slope extends from the inside of the protruding platform to an edge of the same protruding platform along a direction gradually near the notch to form the slope.

11. The connecting device as claimed in claim 10, wherein the installing member comprises a connecting ring with a cylindrical inner-hollow structure, the connecting ring comprising a pair of adjusting screws symmetrically formed to fasten the lens thereon.

12. The connecting device as claimed in claim 7, wherein the installing member comprises a connecting ring with a cylindrical inner-hollow structure, the connecting ring comprising a pair of adjusting screws symmetrically formed to fasten the lens thereon.

13. The connecting device as claimed in claim 6, wherein the installing member comprises a connecting ring with a cylindrical inner-hollow structure, the connecting ring comprising a pair of adjusting screws symmetrically formed to fasten the lens thereon.

14. The connecting device as claimed in claim 1, wherein the installing member comprises a connecting ring with a cylindrical inner-hollow structure, the connecting ring comprising a pair of adjusting screws symmetrically formed to fasten the lens thereon.

15. The connecting device as claimed in claim 1, wherein the adjusting device comprises a plurality of locating holes arranged on the guiding slider.

16. The connecting device as claimed in claim 1, wherein the installing member comprises a connecting ring with a cylindrical inner-hollow structure, the connecting ring comprising a pair of adjusting screws symmetrically formed to fasten the lens thereon.

* * * * *